US006843324B2

(12) United States Patent
Basek

(10) Patent No.: US 6,843,324 B2
(45) Date of Patent: Jan. 18, 2005

(54) GARDENING IMPLEMENT

(76) Inventor: Charles Basek, 3258 Shelburne Place, Oakville, Ontario (CA), L6L 5V9

( * ) Notice: Subject to any disclaimer, the term of this patent is extended or adjusted under 35 U.S.C. 154(b) by 0 days.

(21) Appl. No.: 10/314,441

(22) Filed: Dec. 9, 2002

(65) Prior Publication Data

US 2004/0129436 A1 Jul. 8, 2004

(51) Int. Cl.[7] .............................................. A01B 33/06
(52) U.S. Cl. ....................................... 172/378; 172/111
(58) Field of Search ............................. 172/111, 42, 41, 172/35, 378, 371, 329; 7/114; 175/421, 397; 30/299, 500; 37/378

(56) References Cited

U.S. PATENT DOCUMENTS

| | | | |
|---|---|---|---|
| 342,516 A | 5/1886 | Iwan et al. | |
| 375,556 A | 12/1887 | Madden | |
| 488,918 A | 12/1892 | Clark | |
| 719,723 A | * 2/1903 | Beebe | ......................... 172/373 |
| 722,028 A | * 3/1903 | Lubin | ........................... 172/23 |
| 725,768 A | * 4/1903 | Prevost | ....................... 172/373 |
| 809,476 A | 1/1906 | Thayer | |
| 840,903 A | 1/1907 | Bucknall | |
| 933,227 A | 9/1909 | Billau | |
| 1,039,012 A | 9/1912 | Behrendt et al. | |
| 1,065,456 A | 6/1913 | Lowrey | |
| 1,647,832 A | 11/1927 | Kovar | |
| 1,692,436 A | 11/1928 | Deane | |
| 1,797,101 A | 3/1931 | Ray | |
| 2,018,279 A | 10/1935 | Norcross et al. | |
| 2,030,770 A | 2/1936 | Smith | |
| 2,087,671 A | * 7/1937 | Knights | ...................... 294/50.9 |
| 2,531,297 A | 11/1950 | Rose | |
| 2,680,643 A | * 6/1954 | Cravotta | .................... 294/50.6 |
| 2,686,690 A | 8/1954 | Kushnir | |
| 2,755,718 A | * 7/1956 | Arndt | ........................... 172/42 |
| 2,791,879 A | * 5/1957 | Truran | ........................ 172/378 |
| 2,991,838 A | * 7/1961 | Lane | ........................... 175/220 |
| 3,123,391 A | 3/1964 | Novak | |
| 3,129,771 A | * 4/1964 | Lidstone | ....................... 172/25 |
| 3,136,372 A | * 6/1964 | Roach | ........................... 172/41 |
| 3,198,719 A | * 8/1965 | Stewart | ...................... 294/50.5 |
| 3,273,930 A | 9/1966 | Gottfried | |
| 3,291,231 A | 12/1966 | Kammer | |
| 3,333,881 A | 8/1967 | Hollinger | |
| 3,443,830 A | 5/1969 | Jones | |
| 3,444,938 A | * 5/1969 | Ballmann | .................... 111/101 |
| 3,463,244 A | * 8/1969 | McFadden | .................. 172/378 |
| 3,561,540 A | 2/1971 | Kaszkurewicz | ............. 172/111 |
| 3,567,264 A | * 3/1971 | Baber | ......................... 294/50.7 |
| 3,602,542 A | 8/1971 | Disston | |

(List continued on next page.)

FOREIGN PATENT DOCUMENTS

| | | | |
|---|---|---|---|
| CA | 1290969 | 10/1991 | |
| CH | 137681 | 4/1930 | |
| CH | 179360 | 11/1935 | |
| DE | 295 19 423 U | 2/1996 | |
| FR | 2613578 A1 | * 10/1988 | ........... A01B/33/06 |
| GB | 865902 | 4/1961 | |
| GB | 1 178 615 A | 1/1970 | |
| GB | 2188523 A | * 10/1987 | ............ A01B/1/16 |
| WO | WO 90/06672 | * 6/1990 | ........... A01B/33/00 |

OTHER PUBLICATIONS

International Search Report re PCT/CA96/00326.
International Search Report re PCT/CA94/00546.

*Primary Examiner*—Thomas B. Will
*Assistant Examiner*—Meredith Petravick
(74) *Attorney, Agent, or Firm*—McCarthy Tétrault LLP

(57) ABSTRACT

A manual gardening implement having two tools, for example ground-working tools having tines for breaking up soil. At least one of the tools has two positions, a working position in which it is located at the working end of a shaft of the implement, and a non-working position in which the tool is drawn up the shaft away from the ground-working end of the implement to occupy a retracted position.

22 Claims, 13 Drawing Sheets

U.S. PATENT DOCUMENTS

| | | | |
|---|---|---|---|
| 3,767,251 A | * 10/1973 | San Filipo | 294/50.8 |
| 3,847,227 A | 11/1974 | Myers | |
| 3,960,218 A | * 6/1976 | Atchley et al. | 172/13 |
| D253,390 S | 11/1979 | Bartholomew | |
| 4,232,422 A | * 11/1980 | Fellmann | 16/427 |
| 4,333,198 A | * 6/1982 | Vosbikian | 15/119.2 |
| 4,437,523 A | 3/1984 | Isbell | |
| D274,117 S | 6/1984 | Lapps | |
| D274,687 S | 7/1984 | Hass | |
| 4,603,744 A | * 8/1986 | Ramirez | 172/25 |
| 4,618,003 A | 10/1986 | Hostetter | |
| 4,641,712 A | * 2/1987 | Cravotta | 172/25 |
| 4,723,802 A | * 2/1988 | Fambrough | 294/50.6 |
| 4,819,735 A | 4/1989 | Puckett | |
| 4,832,132 A | * 5/1989 | Barcelon | 172/371 |
| 4,884,638 A | * 12/1989 | Hoffmann | 172/22 |
| D305,604 S | 1/1990 | Keblbek | |
| D306,247 S | 2/1990 | Shields | |
| 4,904,010 A | * 2/1990 | Lacey et al. | 294/19.1 |
| 4,905,768 A | * 3/1990 | Lorenz | 172/25 |
| 4,932,339 A | 6/1990 | List | |
| 4,966,238 A | 10/1990 | Shields | |
| 4,983,281 A | 1/1991 | Montelione | |
| 5,005,888 A | 4/1991 | Parks et al. | |
| 5,013,193 A | * 5/1991 | Rabo et al. | 408/201 |
| D322,918 S | 1/1992 | Parks et al. | |
| 5,207,466 A | * 5/1993 | Ohlson | 294/61 |
| 5,242,024 A | 9/1993 | Van Houten | |
| 5,261,496 A | * 11/1993 | Smotherman | 172/25 |
| D347,980 S | 6/1994 | Butch | |
| 5,338,078 A | 8/1994 | Basek | |
| 5,435,396 A | * 7/1995 | Robichaux | 172/378 |
| 5,452,767 A | * 9/1995 | Smotherman | 172/25 |
| 5,467,830 A | * 11/1995 | Watson | 172/378 |
| 5,469,923 A | 11/1995 | Visser | |
| D376,077 S | 12/1996 | Basek | |
| 5,609,215 A | 3/1997 | Rios et al. | |
| D381,246 S | 7/1997 | Basek | |
| 5,706,900 A | * 1/1998 | Liao | 172/378 |
| 5,716,132 A | * 2/1998 | Chou | 366/129 |
| 5,810,093 A | * 9/1998 | Howard | 172/111 |
| 5,819,856 A | * 10/1998 | Meyer | 172/13 |
| D406,219 S | 3/1999 | Basek | |
| 5,909,778 A | * 6/1999 | Acosta et al. | 172/111 |
| 5,988,292 A | * 11/1999 | Knotts | 172/41 |
| 6,016,876 A | * 1/2000 | Rountree et al. | 172/378 |
| 6,062,992 A | * 5/2000 | Hoyt et al. | 473/408 |
| 6,227,317 B1 | * 5/2001 | Severns | 175/421 |
| 6,233,851 B1 | * 5/2001 | Alexander et al. | 37/195 |
| 6,311,782 B1 | * 11/2001 | Plasek et al. | 172/13 |
| 6,352,122 B1 | * 3/2002 | Love | 172/371 |
| 6,367,236 B1 | 4/2002 | Marcone | |
| 6,418,585 B1 | * 7/2002 | Viner | 15/119.2 |
| 6,536,535 B1 | * 3/2003 | Washek | 172/378 |

* cited by examiner

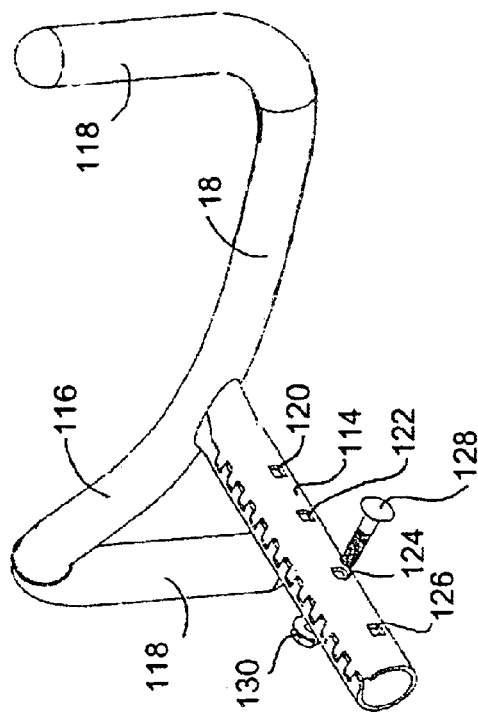
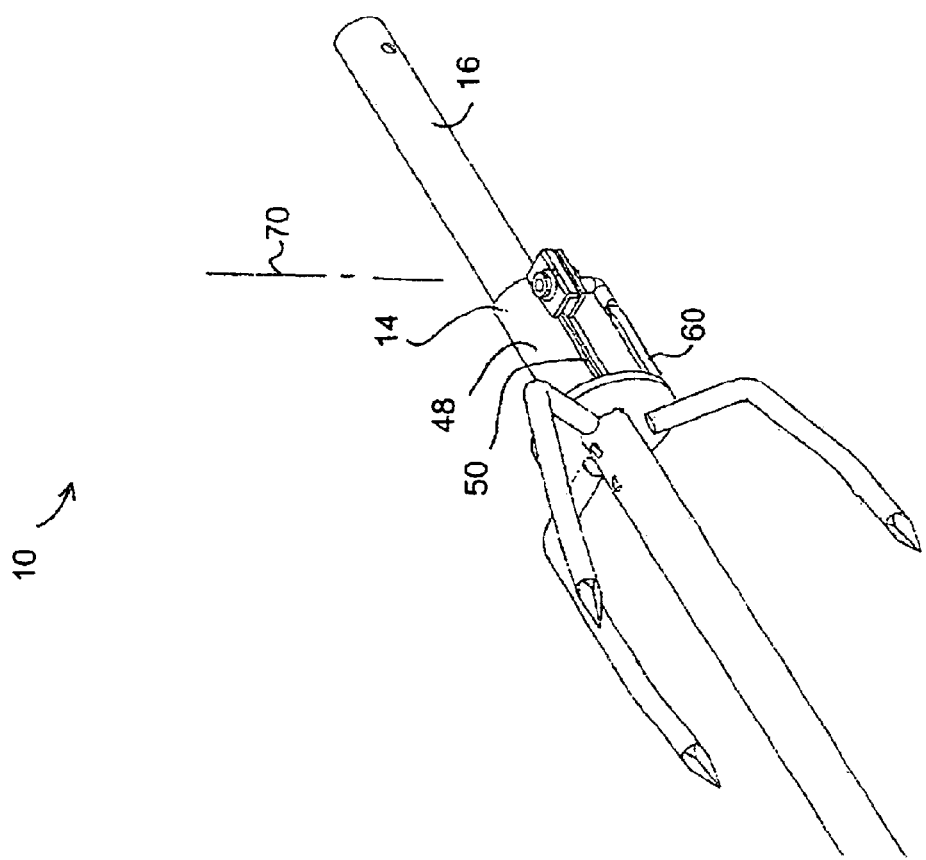
Fig. 3

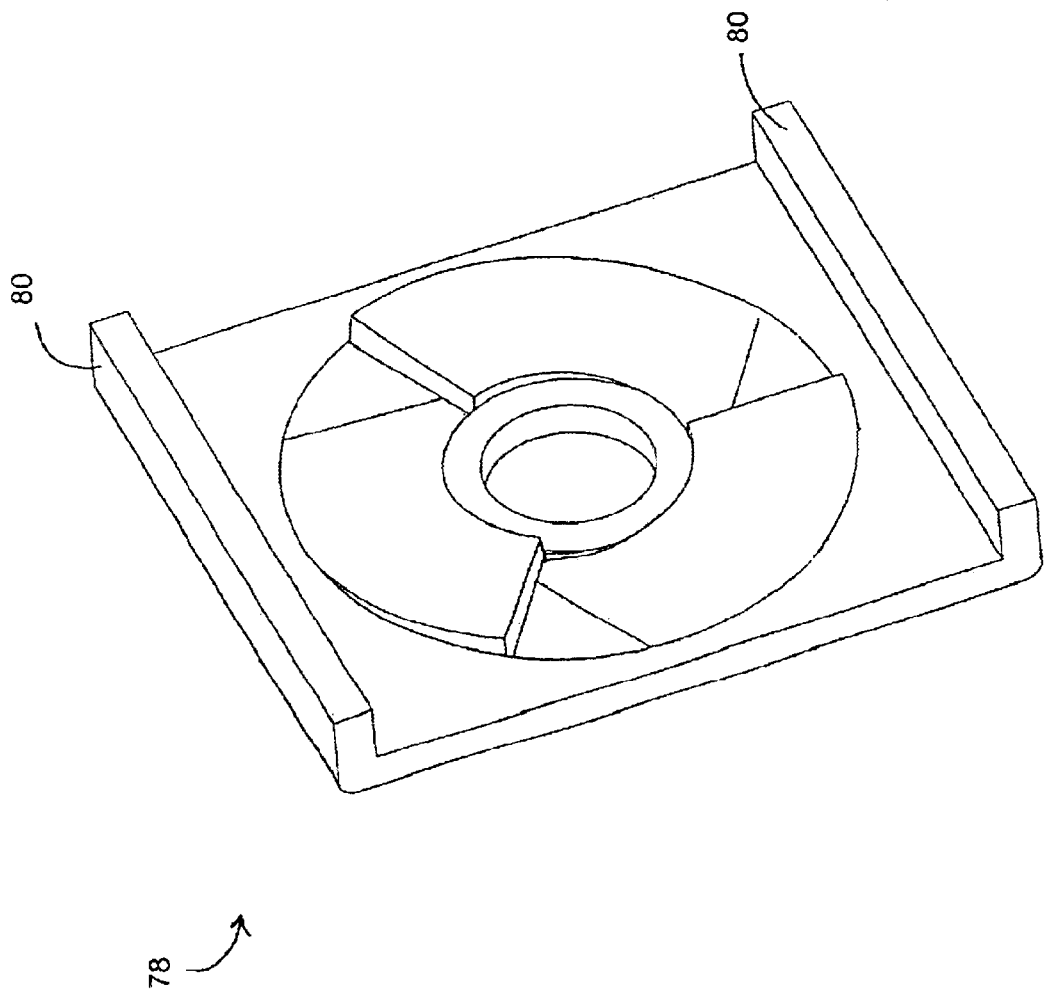

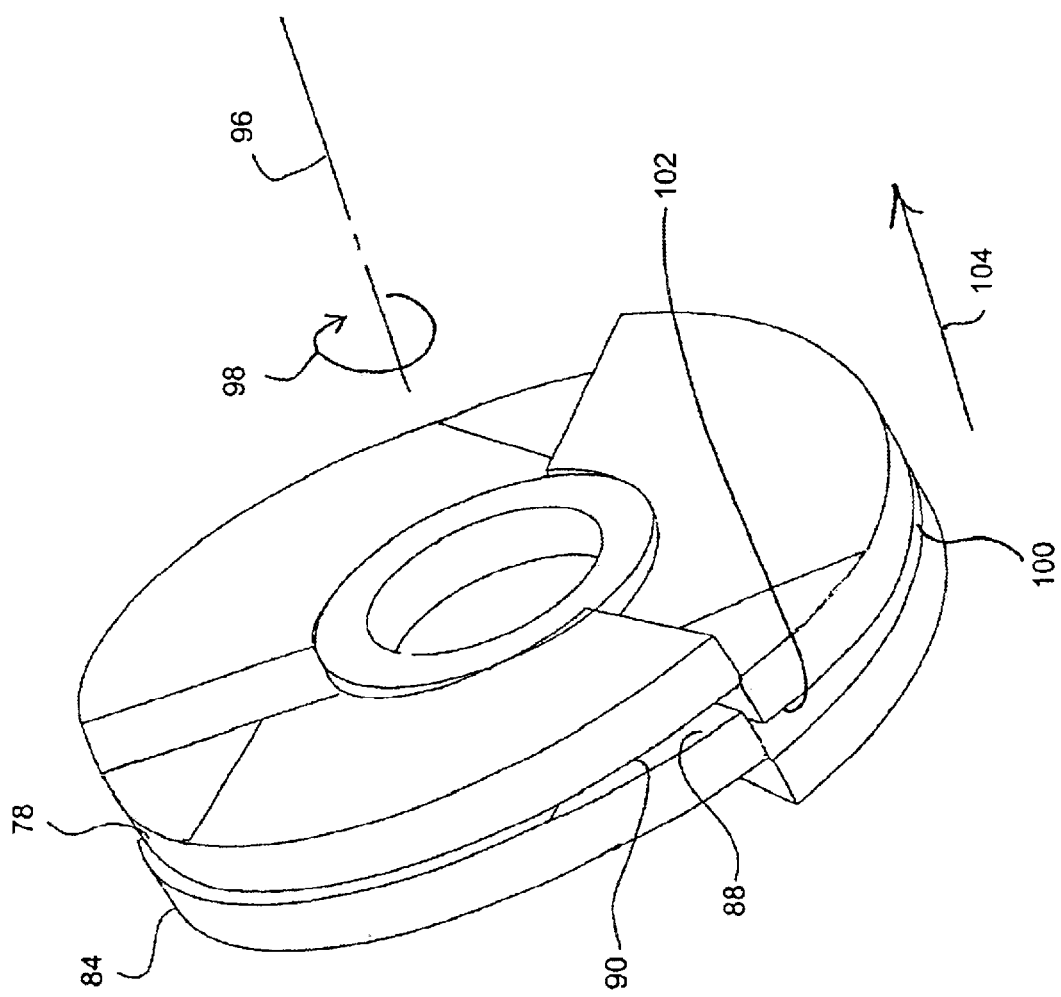

GARDENING IMPLEMENT

FIELD OF THE INVENTION

This invention is in the area of manual gardening implements and tools, particularly an implement the function of which can be selected by movement of a tool into and out of an operating position.

BACKGROUND OF THE INVENTION

Hand-held implements for gardening and ground-working have been known for many years, but a need for improved tools continues to exist, as demonstrated for example by the continual introduction of new implements with different features onto the market. Great numbers of such devices are described in the patent literature. For example, international patent application No. PCT/CA 96/00546, published under WO 97/05761 on Feb. 20, 1997 describes a multiuse lawn and garden tool. An implement having a handle portion onto which can be mounted different types of ground-working devices or tools, that can be selected according to need, is shown.

SUMMARY OF THE INVENTION

In a first broad aspect, the present invention is a manual garden implement. As a manual garden implement, this implement is a hand-held device typically used by a household gardener in a flower or vegetable garden for example. The implement includes:

(a) a shaft having a central axis;
(b) a first ground-working tool mounted at a first lower end of the shaft; and
(c) a second ground-working tool mounted to the shaft, movable along the shaft between a working position at said end of the shaft and a non-working position remote from said end of the shaft.

The second tool includes a sleeve in which the shaft of the implement is received. This permits movement of the tool along the shaft between the lower working and non-working positions. This lends a versatility to the implement. When the second tool is in the working position, both the first and second tools are in a ground-working position. When the second tool is in its non-working position, raised on the shaft to be away from the first tool, the first tool is available for ground-working without the second tool. In the illustrated embodiment, the first tool includes a plurality of tines distanced a first radial distance from the shaft, and the second tool includes a plurality of tines distanced a second, greater radial distance from the shaft. When the second tool is in its working position, the tines of the two tools work together permitting a gardener to work a relatively large amount of soil. When the second tool is raised into its non-working position, the tines of the first tool which are more compact than those of the first permit the tool to be used in more confined areas, for example, between closely spaced plants, plants close to a garden edge or house wall, etc.

Preferably, the implement includes a stop at the working end of the shaft to axially locate the second tool in its working position with respect to the first tool.

The implement can also include a radially extending abutment affixed with respect to the shaft which provides a surface located to abut a surface of the second tool to preclude release of the second tool from the shaft.

The first tool is preferably permanently affixed with respect to the shaft. In the illustrated embodiment, the first tool and the shaft are both of metal and they are permanently welded together.

The first tool can include a plurality of ground-working tines which extend downwardly from the lower end of the shaft. Usually, the tines are spaced radially outwardly from the central axis of the shaft.

The second tool can also include a plurality of ground-working tines which extend axially downwardly from the lower end of the shaft when the tool is in the working position. Preferably, the tines of the second tool includes are spaced radially outwardly of the tines of the first tool.

Usually, and the implement has a first surface affixed with respect to the shaft and a second surface affixed with respect to the second tool, and the first and second surfaces are positioned to abut each other when the second tool is in the working position so as to preclude rotation of the second tool with respect to the shaft. In the below-illustrated embodiments, these surfaces are provided by edges of recesses in a plate welded at the lower end of the shaft (to which tines of the first tool are attached) and tines of the second tool which are received within the recesses when the second tool is in its working position. It would also be possible to make the shaft of the implement to have a non-circular (outer) cross-section (for example, square or hexagonal, etc.) and sleeve of the second tool to have a similar (inner) cross-section. This would approach could alternatively be used to rotationally locate the two tools with respect to each other.

Conveniently, the shaft along which the tool moves is of substantially constant outer cross section and the sleeve has a discontinuity extending between its lower and upper ends. The sleeve is radially movable (as by being manufactured of flexible material) between an expanded position in which an inner surface of the sleeve of the second tool defines an aperture having a cross section greater than said outer cross section of the shaft, to permit said movement of the tool along the shaft, and a contracted position in which the surface frictionally engages the outer surface of the shaft, to inhibit said movement. Preferably, the discontinuity of the sleeve of the second tool is provided by a slit and the sleeve is metal sufficiently flexible to permit said radial movement.

The implement preferably includes a fastener for the second tool so that the tool can be secured in each of its working and non-working positions. As described further below in the detailed description, the implement can include a rotatable fastener mounted to the second tool so as to span the discontinuity in the sleeve, wherein when the fastener is rotated in a fastening first direction, first and second surfaces of the fastener engage respective first and second surfaces of the second tool, the first and second surfaces of the tool being located on either side of the discontinuity, so as to force the first and second surfaces of the tool toward each other to move the inner surface of the sleeve from the expanded to contracted position. This is conveniently achieved by the use of cam surfaces, generally transverse to the axis of rotation of the fastener but inclined at a gentle angle (with respect to a plane orthogonal to the axis of rotation) such that rotation of the fastener causes the sleeve to be "squeezed" onto the shaft.

The sleeve can be biased towards the expanded position. In such an arrangement, the aforementioned camming force is needed to bring the sleeve and shaft surfaces into frictional engagement with each other, and the sleeve naturally opens up (flexes outwardly) as the fastener is rotated from a closed to an open position.

It is also possible to arrange positively engaging surfaces in both directions, to force the sleeve open and closed. Thus, in another aspect, when the fastener is rotated in a releasing second direction, third and fourth surfaces of the fastener engage respective third and fourth surfaces of the second tool, the third and fourth surfaces of the tool being located on either side of the discontinuity, so as to force the third and fourth surfaces of the tool apart to move the sleeve from the contracted to the expanded position.

In another aspect, the inner surface defines an axial bore and the shaft along which the tool moves defines an axial barrel, central axes of the bore and barrel being substantially aligned with each other, and the second tool further comprises first and second outwardly radially extending fingers, each affixed on either side the slit such that movement of the fingers towards each other into a closed position decreases the size of the bore of the sleeve to bring the inner surface of the sleeve into frictional engagement with the shaft, and a fastening member to permit securing the fingers in the closed position.

An implement of the invention also optionally includes means for holding the movable tool in its selected location by means of positively abutting surfaces that are oriented to be generally transverse to the axial direction of movement of the tool with respect to the shaft. The implement can thus include a first abutment surface affixed with respect to the shaft and transverse to the shaft axis, and a fastener mounted to the second tool, movable between a fastening position and a releasing position, the fastener having a second abutment surface transverse to the shaft axis, wherein the first abutment surface is axially positioned and the second abutment surface is positioned to permit, when the second tool is in the non-working position, engagement of the first and second abutment surfaces with each other to preclude axial movement of the second tool into the working position when the fastener is moved into the fastening position.

Further, of course, a similar arrangement can be used to hold the second tool in its non-working position. The implement can thus include a first abutment surface affixed with respect to the shaft and transverse to the shaft axis, and a fastener mounted to the second tool, movable between a fastening position and a releasing position, the fastener having a second abutment surface transverse to the shaft axis, wherein the first abutment surface is axially positioned and the second abutment surface is positioned to permit, when the second tool is in the working position, engagement of the first and second abutment surfaces with each other to preclude axial movement of the second tool into the non-working position when the fastener is moved into the fastening position.

The fastener can be a toggle having a distal end rotatably mounted about an axis transverse to the shaft axis and a proximal end by which the toggle can be manually moved between the fastening and releasing positions. The first abutment surface can located radially inwardly of the outer surface of the shaft within a recess thereof and the toggle can thus include a tab received within the recess when the fastener is in the fastening position. Abutment of tab surfaces and surfaces defining the recess serve to secure the second tool against axial movement as long as the toggle is in its closed position.

In another aspect, the shaft of the implement of the invention along which the tool moves is of substantially constant outer cross section and the sleeve has a discontinuity extending between its upper and lower edges and is made of metal sufficiently flexible to be radially movable between an expanded position in which an inner surface of the sleeve defines an aperture having a cross section greater than said outer cross section of the shaft, to permit said movement of the tool along the shaft, and a contracted position in which the surface frictionally engages the outer surface of the shaft, to inhibit said movement, and the fastener is mounted to the second tool so as to span said discontinuity, wherein when the fastener is rotated from the fastening position to the releasing position, first and second surfaces of the fastener engage respective first and second surfaces of the second tool, the first and second surfaces of the tool being located on either side of the discontinuity, so as to force the first and second surfaces of the tool toward each other to move the inner surface of the sleeve from the expanded to contracted position.

As mentioned above, the first tool can be affixed at the lower end of the shaft and extend a first radial distance from the axis of the shaft, and the second tool, when in the working position, can extend a second radial distance from the axis of the shaft, wherein the second distance is greater than the first distance.

Preferably, the implement includes a handle at an upper end of the shaft, opposite to the location of the first tool, the handle being detachable from the shaft to permit release of the second tool from the implement by said movement along said shaft and past the upper end.

In a particular aspect, the implement includes a handle having a downwardly depending column having an axis, the column having a first opening transverse to the column axis for receipt of a fastening member therethrough, and wherein the shaft of the implement has a second opening transverse to the shaft axis for receipt of the fastening member therethrough, wherein the first and second openings are located and the column is shaped for assembly onto the shaft with the first and second openings in communication with each other for insertion of the fastening member therethrough so as to axially affix the handle with respect to the shaft.

Preferably, the column has a plurality of the first openings axially spaced from each other, and/or the shaft has a plurality of the second openings axially spaced from each other. This permits a user to select the distance of the handle from the lower end the shaft (i.e. the height of the implement) by axial movement of the column with respect to the shaft into a position in which a selected pair of first and second openings are in communication with each other and insertion of the fastening member therethrough to affix the handle at the selected distance.

In one particular aspect, the invention is a manual garden implement comprising:

(a) a shaft having a central axis;
(b) a first ground-working tool mounted at a lower end of the shaft; and
(c) a second ground-working tool having a sleeve into which is received the shaft, the tool being movable along the shaft between a working position at the lower end of the shaft and a non-working position above the lower end of the shaft; wherein:
  (i) the portion of the shaft along which the tool moves between the working position and the non-working position is of substantially constant outer cross section and the sleeve is flexible and has an opening extending its length so as to be radially movable between an expanded position in which an inner surface of the sleeve of the second tool defines an aperture having a cross section greater than said outer cross section of the shaft, to permit said movement of the tool along the shaft, and a contracted position in which the surface frictionally engages the outer surface of the shaft, to inhibit said movement;

(d) a fastener mounted to the second tool so as to span the opening, rotatable between a fastening position and release position, wherein when the fastener is rotated from the release position to the fastening position, first and second surfaces of the fastener engage respective first and second surfaces of the second tool, the first and second surfaces of the tool being located with respect to the opening and the engages surfaces being shaped such that the first and second surfaces of the tool toward each other to move the inner surface of the sleeve from the expanded position to the contracted position; and (e) a first abutment surface affixed with respect to the shaft, and wherein:

(i) the fastener has a second abutment surface, wherein the first abutment surface is axially positioned and the second abutment surface is positioned to permit, when the second tool is in the non-working position, engagement of the first and second abutment surfaces with each other to preclude axial movement of the second tool into the working position when the fastener is in the fastening position. The invention includes a method of manufacturing any of the tools described herein. In one such aspect, the invention is a method of manufacturing a gardening implement that includes the steps of:

providing a first part having a shaft and a first tool affixed at a lower end of the shaft;

providing a second part comprising a second tool having a sleeve for receipt of the shaft therethrough; and assembling the first and second parts by inserting an upper end of the shaft through the sleeve and sliding the second tool into an assembled position on the shaft with respect to the first tool.

In another aspect, the method includes providing a handle and means for affixing the handle to the upper end of the shaft to preclude release of the second tool from the shaft.

In another aspect, the method includes the step of assembling the handle to the upper end of the shaft. Alternatively, the method can include providing the second tool assembled onto the shaft and the handle into a package for sale to a consumer. In this embodiment, the package would include instructions to the consumer to complete the assembly, as by the inclusion of a package insert, or even by an illustration presented on a box in which the product is packaged.

BRIEF DESCRIPTION OF THE DRAWINGS

A detailed, but non-limiting, description of the invention will now be given, reference being made to the accompanying drawings in which:

FIG. 3 is a perspective type view of the FIG. 1 embodiment showing the underside of the second tool and the upper handle of the implement;

FIG. 13 shows a cam plate of the fastening mechanism of the FIG. 7 embodiment; and FIG. 14 illustrates relative positions of can surfaces of the toggle and cam plate of FIGS. 12 and 13.

DETAILED DESCRIPTION OF THE INVENTION

Figure 2:
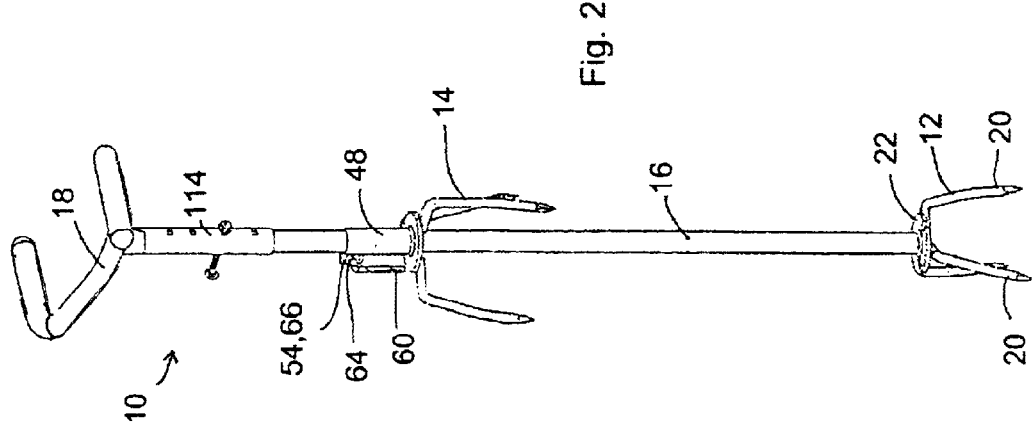
FIG. 2 is a view similar to that of FIG. 1, but in which the second tool is in a raised, non-working position.
Figure 1:
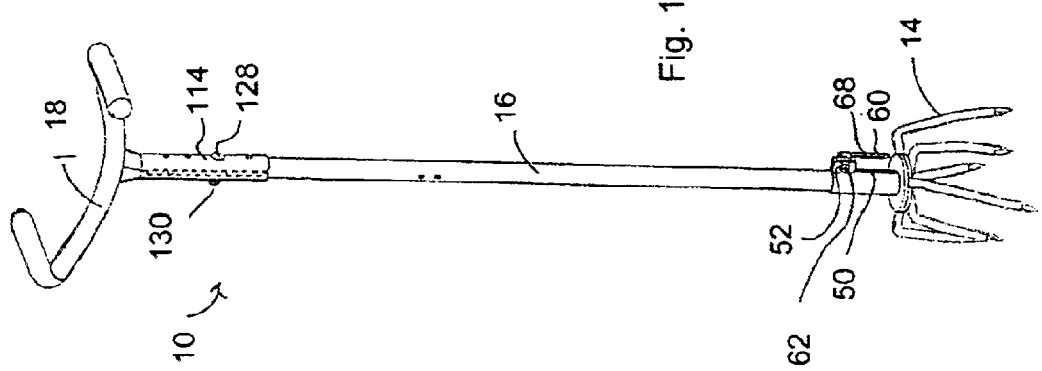
FIG. 1 is a perspective type view of a first embodiment of the invention having a first ground-working tool fixed at the bottom of its shaft, and a second tool in a lowered, working position.
Figure 4:
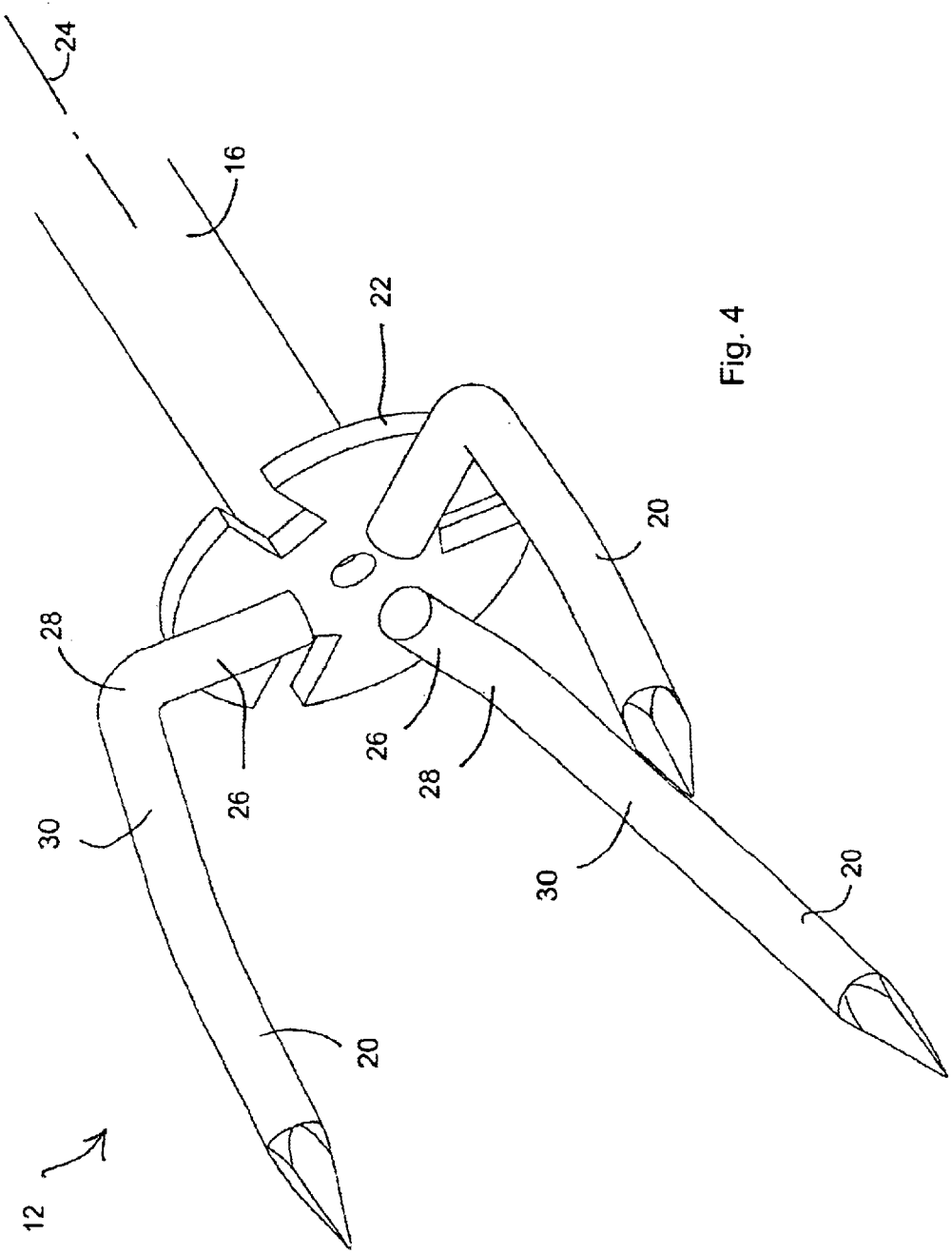
FIG. 4 is a perspective type view of the FIG. 1 device viewed from below the ground-working end showing the shaft and the first tool.

Turning to the drawings, a gardening implement 10 of the invention having a pair of tools is shown. In FIGS. 1 and 2 both first ground-working tool 12 and second ground-working tool 14 can be seen. The implement includes shaft 16 and handle 18 for manipulation of the tool by a gardener, yard worker, or other user.

Figure 5:
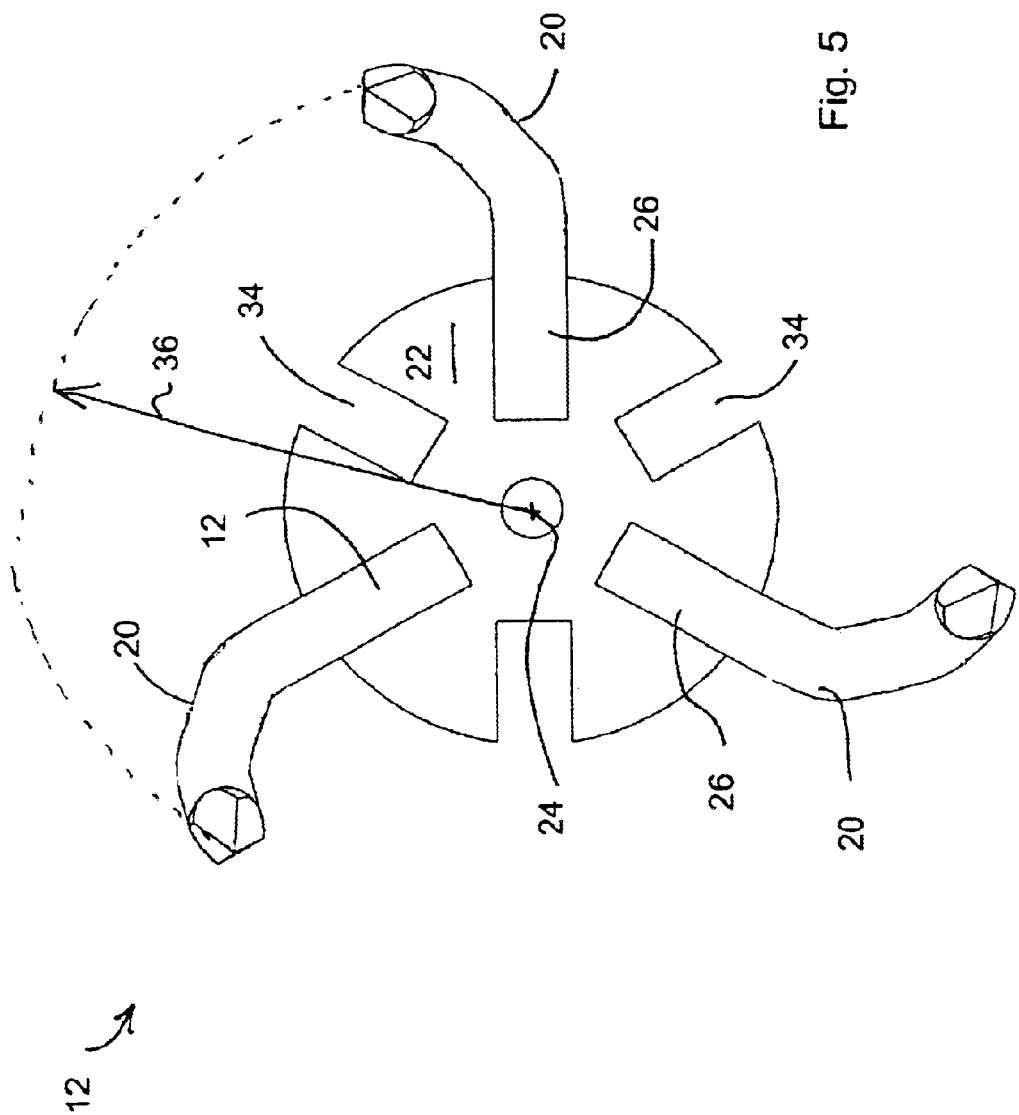
FIG. 5 is a bottom end view of the first tool of the FIG. 1 embodiment.
Figure 6:
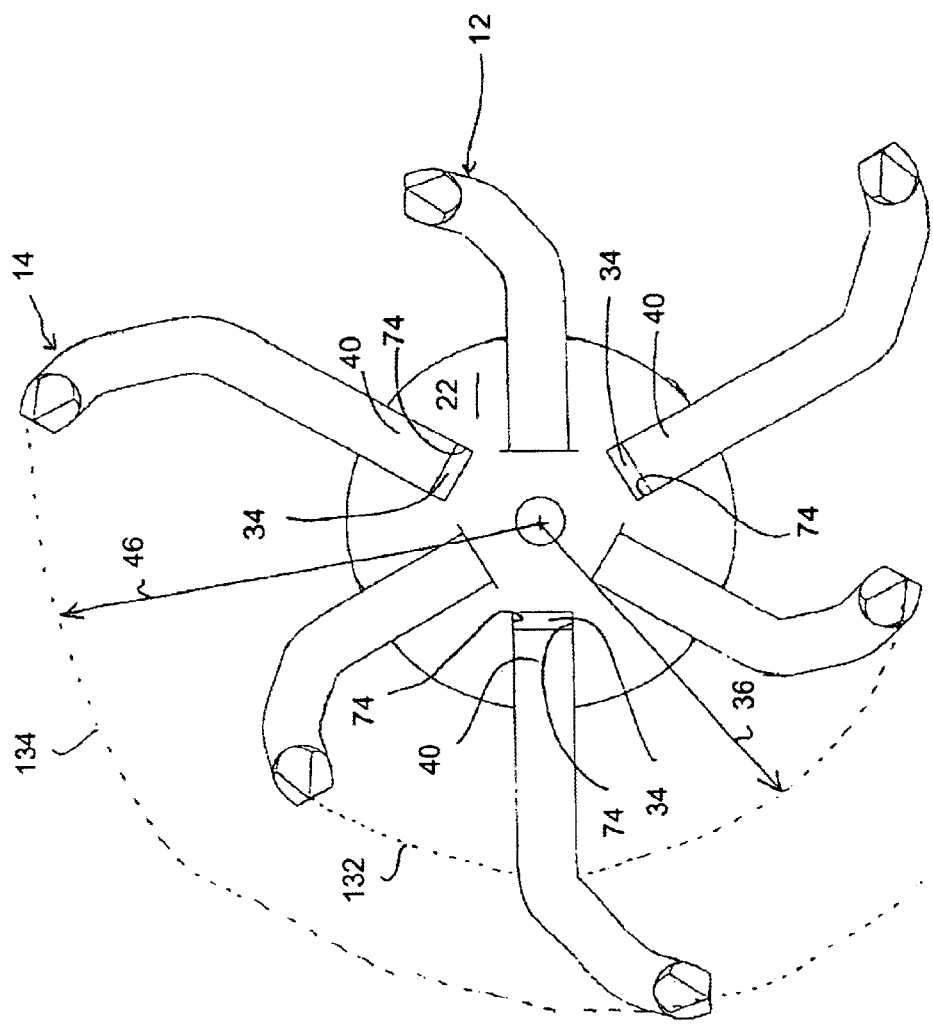
FIG. 6 is a bottom end view showing the first and second tools with the second tool being in its lowered, working position.

First tool 12 is permanently affixed at the lower end of the shaft. The tool includes three tines 20 which generally extend axially downwardly from the lower end of the shaft. The tines are affixed with respect to the shaft by means of plate 22. Extending radially outwardly from central axis 24 of the shaft, each tine 20 has a first arm portion 26 which bends at elbow 28 downwardly into a second arm portion 30 which extends axially downwardly from the shaft, the upper portion of each portion 30 forming an angle of about 30° with central axis 24 of the shaft, as can be seen in the drawings. The tines are the same as each other and are spaced evenly about the central axis, that is each upper arm portion 26 is spaced 120° from its two neighbors when viewed from above or below (along the axis of the shaft) as in FIGS. 5 and 6. Maximum radius 32 of the three tines of the first tool can be seen in FIGS. 5 and 6, and this radius is equal to about 1¾ inches (roughly 4.5 cm).

The number of tines, their general shape, size, positioning with respect to each other can be varied of course, to provide a tool most suitable for a particular ground-working or gardening application. The shape of each tine and angle that each tine makes with the central axis of the shaft of the implement can of course be varied. The tines can be parallel with the axis (i.e., form an angle of 0°) or make an angle of up to about, for example, 45°. The tips of the tines should be shaped and angled to facilitate entry of the tool into the soil or ground to be worked. The illustrated implement is intended to be twisted about the shaft axis in a screwing motion to facilitate entry of the tool, or tools, into the ground. As can be seen, in this instance the implement is provided with tools that are particularly well suited for use by a home gardener in cultivating a vegetable and or flower garden.

In the illustrated embodiments, plate 22 is generally circular or triangular and is permanently affixed to the bottom end of the shaft by welding, and the tines are in turn welded to the plate. Plate 22 includes three notches 34, or recesses, which extend radially inwardly towards the central axis of the shaft from the outer perimeter of the plate. Each recess is dimensioned and located for receiving a radially extending portion of a tine of the second tool 14, as described further below, so that that here recesses are substantially the same as each other and they are evenly angularly spaced about the central axis of the shaft, there being an angle of about 120° between each recess (or the central radial line thereof) and its neighbor. The recesses are evenly interspersed between the three tines 20 of the first tool. The function of these recesses, which relates to second tool 14, is described below.

Shaft 16 is about 26 inches (about 65 cm) in length, is hollow, and of circular constant cross section, the outer diameter being about ⅞ inches (roughly 2.2 cm).

Tool 14 is mounted on shaft 16, and movable along the shaft between a lower working position shown in FIG. 1, and the upper position shown in FIG. 2. The ground-working part of the tool includes three tines 36 which generally extend axially downwardly. The tines are affixed to plate 38 which surrounds shaft 16. Extending radially outwardly of central axis 24 of the shaft, each tine 36 has a first arm portion 40 which bends at elbow 42 downwardly into a second depending arm portion 44. The tines are the same as each other and are spaced evenly about the central axis, that is each upper arm portion 40 is spaced 120° from its two neighbors when view from above or below (along the axis of the shaft). Maximum radius 46 of the three tines of the first tool can be seen in FIG. 6, and this radius is equal to about 3⅜ inches (roughly 8½ cm).

Sleeve 48 of tool 14 and plate 38 are permanently affixed to each other by welding around the bottom end of the sleeve. Sleeve 48 wraps around the shaft, but does not completely surround the shaft in the sense that it includes an opening or slit 50. The sleeve is of metal that is slightly flexible and the sleeve can expand to the point (as explained below) that it is frictionally released from engagement of the shaft received therethrough.

Extending radially outwardly of the sleeve are tabs or fingers 52, 54. These are metal tabs, one affixed to the sleeve on each side of the slit 50. Each of the tabs has an aperture through it, the two apertures of the tabs being in communication with each other. Received in the communicating apertures is screw fastener 60, which spans the slit 50 of the sleeve. Threaded end 62 of the fastener is threadingly received in the aperture of tab 52, which aperture is matingly threaded to so receive the fastener. Abutment collar 64 of the fastener abuts outer surface 66 of the second tab 54. Fastener 60 has a bent shape to provide free end 68 by which the fastener can be manipulated, that is rotary motion imparted to the threaded end of the fastener. One can thus see that it is possible by rotation of the fastener about axis 70, with abutment of collar 64 against surface 66, to draw tabs 52, 54 together. Being rigidly or integrally affixed as part of the sleeve, drawing the tabs towards each other causes a narrowing of slit 50 and contraction in the size of the passageway defined by sleeve 48 through which shaft 16 passes. Sufficient contraction of the sleeve brings interior surface 72 of the sleeve into contact with outer surface 73 of the shaft which leads to frictional engagement of the sleeve and shaft (much like the action of a vice) such that the sleeve and shaft are generally fixed against movement with respect to each other. Rotation of fastener 60 in the opposite direction about axis 70 permits the sleeve to relax to its unstressed, expanded position (FIG. 10) so as to release the sleeve from frictional engagement with the shaft. Appropriate rotation of fastener 60 can thus bring the sleeve into an expanded or open position, in which the sleeve and shaft are moveable with respect to each other, or can bring the sleeve into a contracted or closed position, in which the sleeve and shaft are fixed against movement with respect to each other.

With the sleeve in the expanded position, second tool 14 is movable axially along shaft 16. The tool is thus free to be brought into the working position illustrated in FIG. 1. In this position, the user rotates tool 14 as may be required with respect to the shaft to bring each of the tine arms 40 into receipt within recess 34 of plate 22. The second tool thus is fixed against rotation with respect to the shaft when in its working position by abutment of tine arms 40 against inner radial surfaces 74 of notches 34. In any case, once the second tool is brought into its working position, end 68 is used to rotate the fastener so as to close the sleeve onto the shaft to axially fix the second tool in its working position at the lower end of the shaft. Further abutment means, beyond frictional contact of shaft and sleeve surfaces, for securing the second tool in a given position, are described below in connection with a second embodiment.

Figure 7:
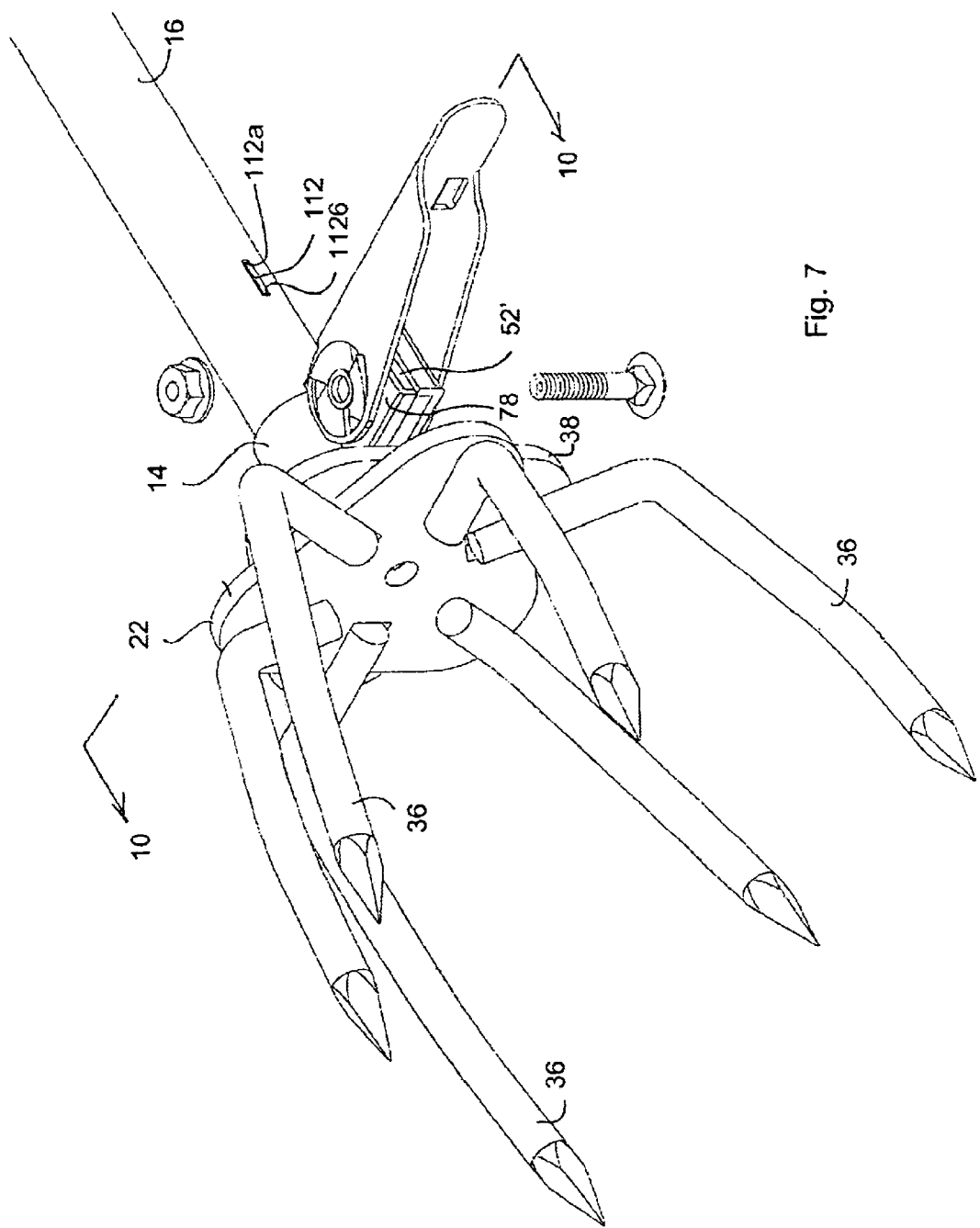
FIG. 7 is a perspective type view of a second embodiment of the invention, having a second fastening mechanism for the second tool, the second tool being in a lowered working position and the fastening mechanism being in an open position.
Figure 8:
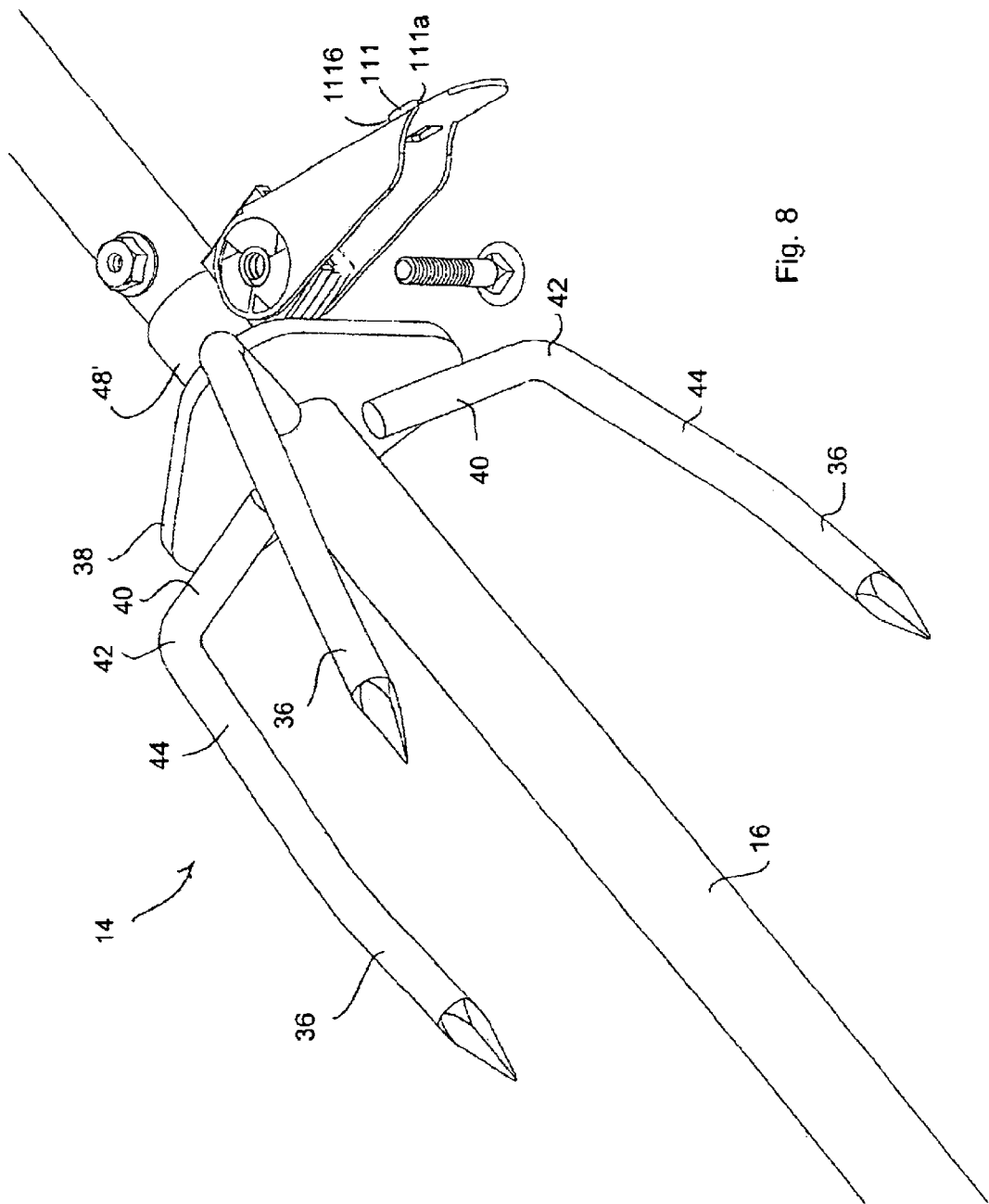
FIG. 8 is perspective type view of the FIG. 7 embodiment with the second tool in a raised non-working position along the shaft of the implement, and the fastening mechanism in an open position.
Figure 9:
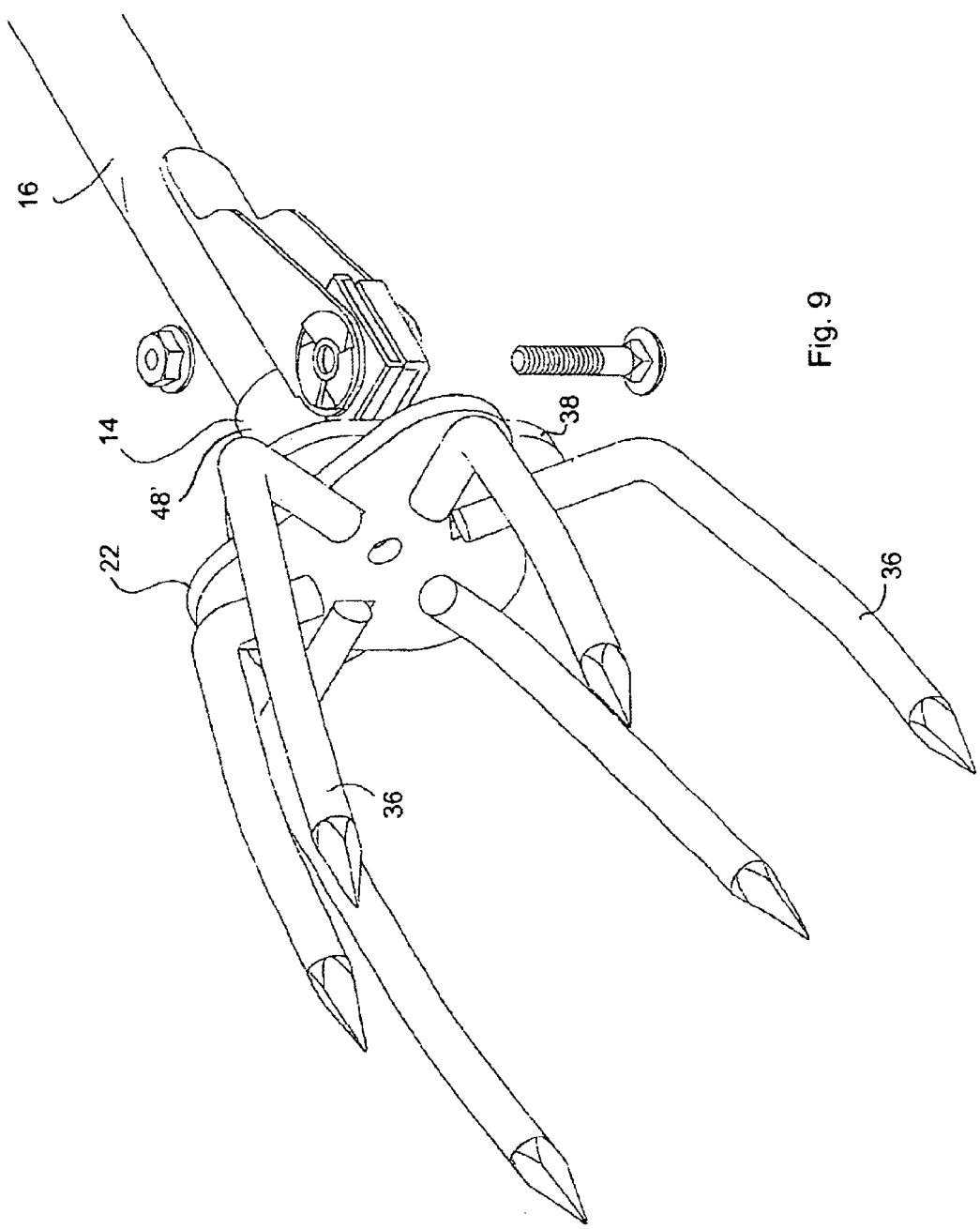
FIG. 9 is perspective type view similar to that of FIG. 7, but with fastening mechanism of the second tool in a closed or fastened position.
Figure 10:
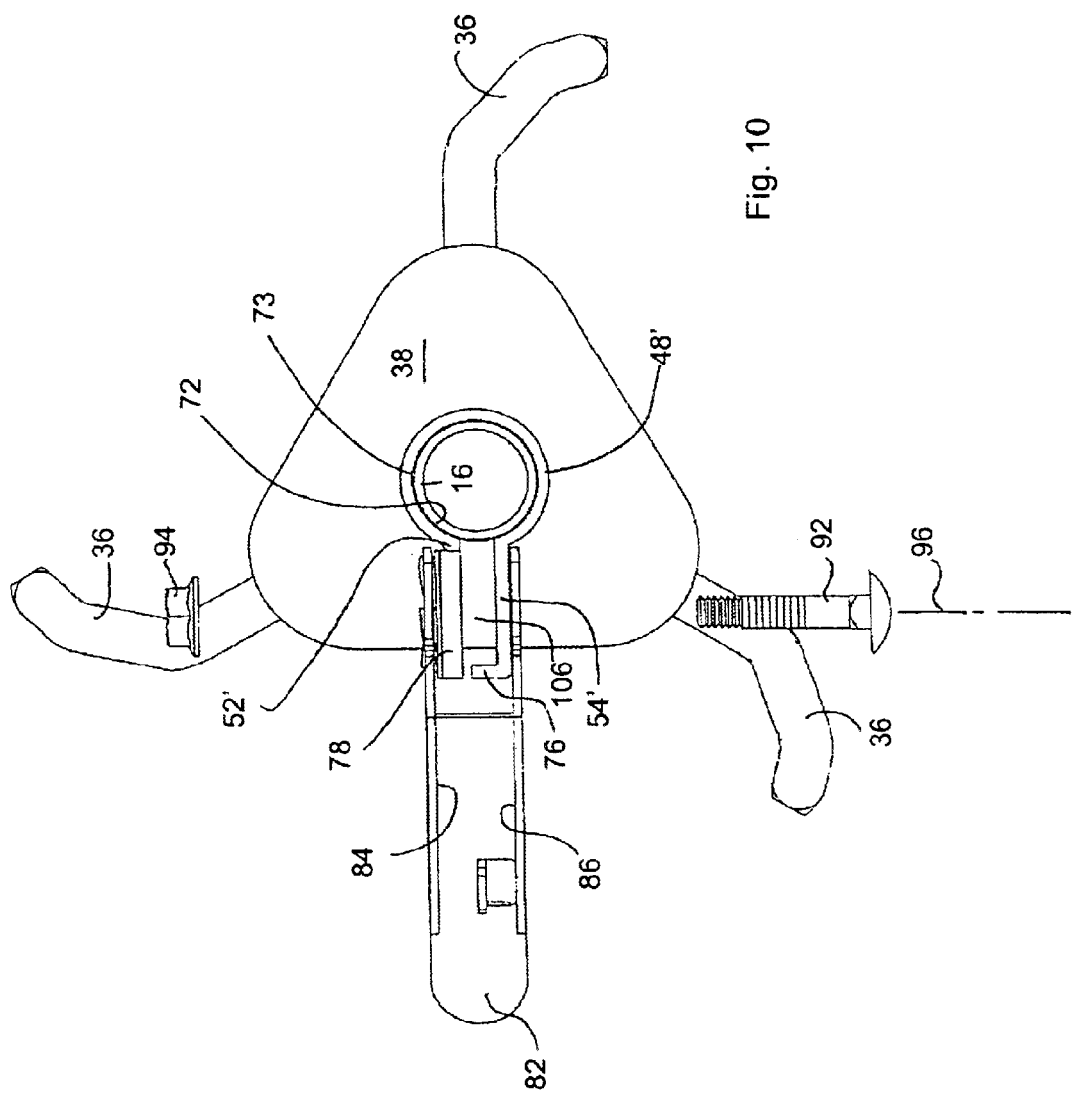
FIG. 10 is a sectional type view of the second tool of the FIG. 7 embodiment taken along line 10—10 of FIG. 7, the fastening mechanism being in an open or released position.

An alternative mechanism for securing second tool 14 in an axial position with respect to the shaft 16 is illustrated in FIGS. 7 to 14. In this embodiment, the sleeve 48' includes first tab 52' and second tab 54'. Second tab 54' includes lip 76 to create a cove. Received onto tab 52' is cam plate 78, which includes lips 80 for receipt therebetween of tab 52', as can be seen in FIGS. 7 and 10. U-shaped toggle 82 is installed with tabs 52', 54' and cam plate 78 received between bearing plates 84, 86 of the toggle. Cam surfaces 88 on in the inner surface of plate 84 are in camming abutment with cam surfaces 90 of cam plate 78, the operation of which is described further below. Toggle 82 is pivotally connected to the sleeve by bolt 92 received through communicating apertures of the toggle bearing plates 84, 86, cam plate 78, and tabs 52', 54' and secured in place by nut 94.

Figure 11:
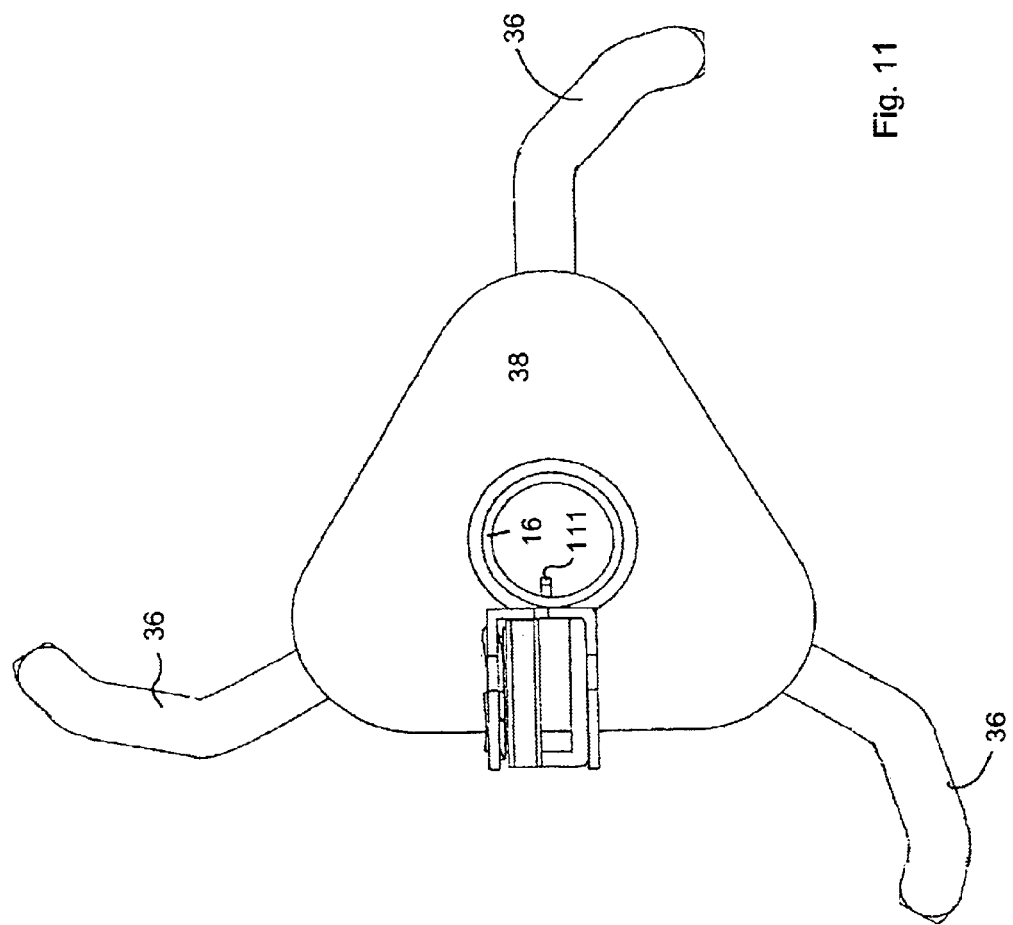
FIG. 11 is similar to FIG. 10, but the fastening mechanism of the second tool is in a closed position.
Figure 12:
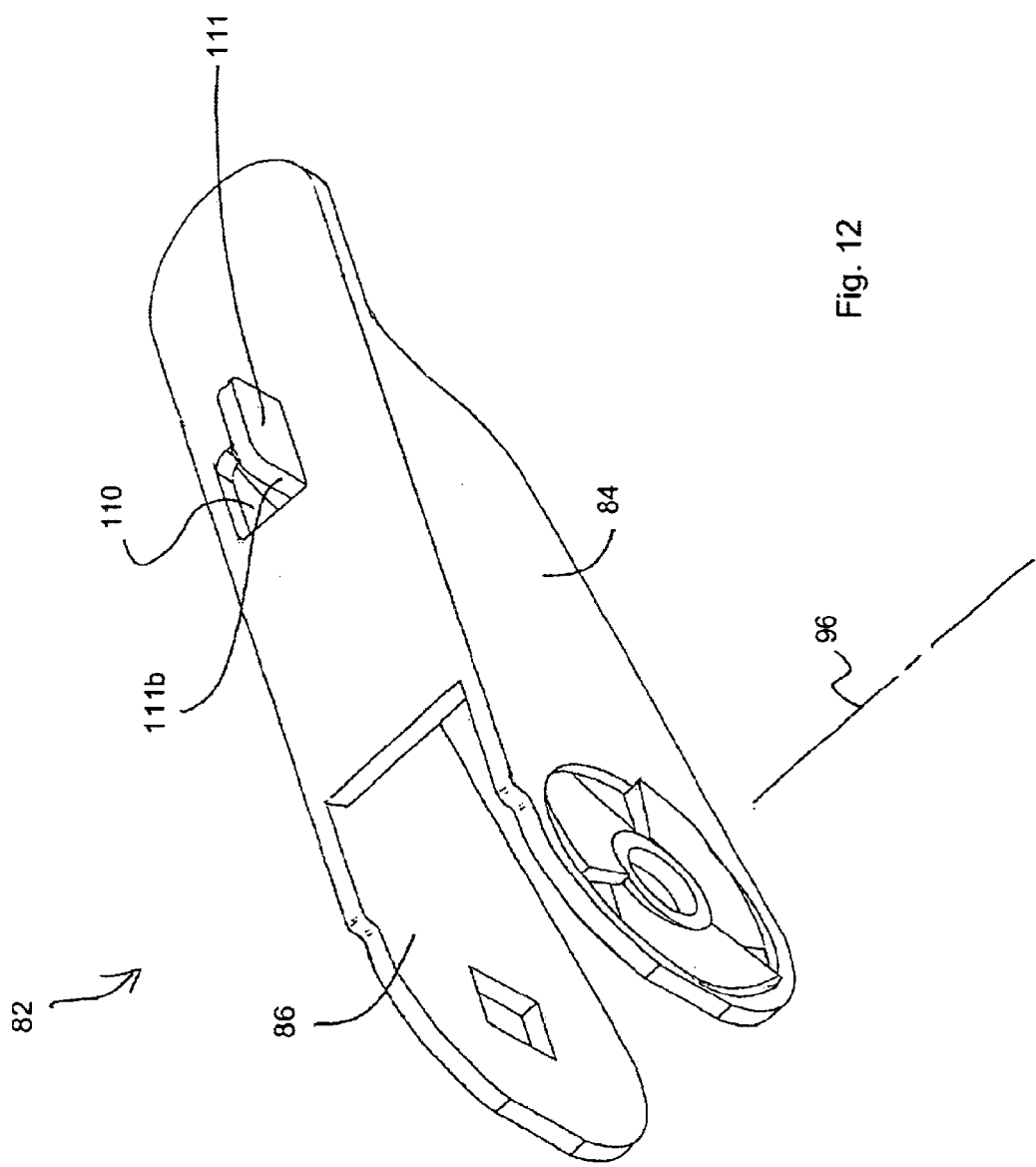
FIG. 12 shows a toggle of the fastening mechanism of the second tool of the FIG. 7 embodiment.

Toggle 82 pivots between the open position shown in FIGS. 7, 8 and 10 and the closed, or fastened position, shown in FIGS. 9 and 11. As described in greater detail below, when the toggle is in the open position, tool 14 is free to move axially along shaft 16 of the implement. When the toggle is in the closed position, tool 14 is fixed against axial movement along the shaft.

Turning to FIG. 14, the cam surfaces of plate 78 and toggle 82 are shown as they would be in relation to each other when the toggle assumes its open or relaxed position illustrated in FIGS. 7, 8 and 10. In this position, sleeve 48 is in its relaxed position in which its inner diameter exceeds that outer diameter of shaft 16. Toggle 82 is hinged, or pivots on the shaft of bolt 92 having central axis 96, i.e., an axis of rotation for the toggle. When a gardener moves the toggle from the position shown in FIGS. 7 and 8 to the position shown in FIG. 9, the cam surfaces of the toggle rotate about axis 96 in the direction of arrow 98. In the course of this rotation, toggle cam surface 100 moves into engagement with plate cam surface 102 forcing cam plate 78 in the direction of arrow 104. With cam plate 78, and tabs 52', 54' sandwiched between bearing plates 84, 86 of the toggle, this rotation leads to relative movement of plate 78 in the direction of arrow 104 towards tab 54' so as to reduce gap 106 between the tabs, so as to decrease the inner diameter of the sleeve to which the tabs are attached. As in the previously described embodiment, the sleeve is thus squeezed onto the shaft so that frictional contact between the inner sleeve surface 72 and outer shaft surface 73 inhibits axial movement of tool 14 with respect to shaft 16.

Toggle 82 includes aperture 110 in its primary arm from which extends bent tab 111. Tab 111 is received within aperture 112 (FIG. 7) formed in the shaft wall when the toggle is moved into its closed position which results in abutment of tab surfaces 111a, 111b with corresponding surfaces 112a, 112b (defining walls of aperture 112) of the shaft. Abutment of surfaces 111a, 112a, and 111b, 112b, the surfaces being transverse to the axis of the shaft, prevents axial movement of the second tool with respect to the shaft so long as the toggle is in its closed position. This helps to ensure that when a gardener is using the implement and tool 14 is pushed axially against the ground, that tool 14 does not slide up the shaft out of its working position. The arrangement also helps to ensure that the second tool, when in the non-working position, does not inadvertently slide down the shaft during use.

It will also be appreciated that there are reaction forces to the squeezing of the sleeve onto the shaft when the toggle is in its closed position. Lips 52', 54' press in opposite directions away from each other along axis 96 bringing forces to bear against toggle plates 84, 86. The toggle plates are thus squeezed between the lips and the head of bolt 92 and nut 94. This creates frictional resistance to rotation of the toggle out of its closed position, helping to hold tab 111 in place within aperture 112.

When the sleeve is loosened on the shaft through movement of the toggle into its release position, it may be moved between the non-working and working positions. The height (s) of the non-working position(s) of the tool on the shaft is pre-selected in the design of the implement taking into account convenience and safety. The mechanics of affixing the moveable tool in its non-working position are similar to those of affixing the tool in its working position. Again there is a second aperture similar in size and shape to aperture 112 located axially up the shaft, for receipt of tab 111 so that release of the second tool from its non-working position requires movement of the toggle 82 out of its closed position. It is possible for there to be other means for locating the second tool in a non-working position.

It will be appreciated that, given this disclosure, other fastening mechanism would be available to a person skilled in the art. For example, a "quick-release" mechanism such as that used to secure a bicycle wheel in place could be adapted for use here. A set screw could be used to locate and secure the second tool in its working and/or non-working positions.

Implement 10 also includes adjustable handle 18. Handle 18 includes downwardly depending column or tube 114 having open at its bottom end for receipt of shaft 16 therein. Affixed by welding to the top of tube 114 is "S"-shaped gripping arm 116 with which the implement may be manipulated for ground-working operations. Each end of arm 116 is fitted with a plastic grip 118.

Tube 114 includes a series of spaced diametrically paired apertures 120, 122, 124, 126, the members of each pair being in communication with each other. Shaft 16 includes a corresponding pair of apertures spaced about ¾ inches from the top of the shaft. The shank of fastening bolt 128 is dimensioned for receipt through paired apertures. The overall height of the implement can thus be adjusted to any one of four predetermined heights, which heights are determined by the location of apertures 120, 122, 124, 126. In FIG. 1, tube apertures 124 are aligned to be in communication with apertures of the shaft and shank of bolt 128 received therethrough and nut 130 secured thereon. The height of the implement could be increased by removal the nut and bolt, realignment of the shaft apertures with tube apertures 126 and re-securement of the nut and bolt. Likewise, the height of the implement could be shortened by removal the nut and bolt, realignment of the shaft apertures with tube apertures 122 (or apertures 120) and re-securement of the nut and bolt. Alternatively, or additionally, the shaft could include a plurality of paired holes to provide for implement height adjustment. The column of the handle might be dimensioned for receipt within the shaft, although this removes the option of having the handle tube squeezed onto the shaft to reduce play between these elements.

The gardening implement is made of any suitably rigid material, taking into account the resilient flexibility of the sleeve of the second tool, etc. In the illustrated embodiment, for example, the handle and shaft can be manufactured of 1008 grade carbon steel and the tines of the tools can be of 1018 grade carbon steel.

The invention is thus a gardening implement which provides the user with, among other things, the option of using a first tool or the first tool in combination with the second tool. In the illustrated embodiment, the first tool includes a plurality of downwardly extending pointed tines evenly spaced from each other, and evenly spaced about a central rotation axis of the implement. The points of the tines all lie on a first circle 132 centred on the axis. The second tool includes a plurality of downwardly extending ground-breaking pointed tines evenly spaced from each other, and evenly spaced about a central rotation axis of the implement. The ground-breaking points of the tines all lie on a second circle 134 centred on the axis. The second circle has a radius 46 that is greater than radius 36 of the first circle. See FIG. 6.

Use of the tools in combination with each other permits a greater amount of earth to be worked at a time. Use of the first tool alone permits the working of earth in a more confined space, as between plants, or between plants and closely located wall or fence, etc.

The implement thus provides a user with the ability to use a single tool or a combination of tools, as appropriate, without the need for a second separate implement, or without the need for releasing one of the tools (and storing in a separate location when not in use). The different tool combinations can also be obtained without the need for user contact with the working (and often muddied) portions of the tool. In other words, the second tool can be brought into and out of its working position with manipulation of fastener 68 and sleeve 48 and without contact with tines 36.

The second tool of the second embodiment of the implement described above has a fastening mechanism that works in two ways. As described above, receipt of tab 111 into shaft aperture 112 provides a positive engagement of abutting surfaces that are transverse to the axis of the shaft. This positive engagement helps to ensure that forces encountered by the second tool in use do not dislodge the second tool from its position. In the instance of the tool being located in its raised position, this arrangement contributes to the safety of the device. This is because the second tool should not be readily inadvertently disengaged from its upper position. This could lead to the tool sliding down the shaft, when not wanted by the user, and this is generally undesirable. The fastening mechanism of the second tool also "squeezes" the sleeve of the tool onto the shaft so that the outer surface of the shaft and inner surface of the sleeve frictionally engage each other when the toggle is in its fastening position. This engagement helps to affix the second tool rigidly with respect to the shaft so that there is little or no play between the two elements in use. This is generally desirable as jiggling of the second tool is considered a disadvantage. Such play can also lead to unwanted wear of surfaces that rub against each during such interplay.

For the purposes of this description and particularly in the claims, the term "comprising" is intended to be taken in an open-ended sense, unless its context would dictate otherwise. A composition comprising a combination of A and B is thus intended, for example, to include a composition made up of A and B, or A, B and C, or A, B, C and D, etc.

All documents mentioned in this description are incorporated herein by reference as though their entire contents were reproduced herein. Further, Applicant reserves the right to incorporate any part of any document mentioned herein into this specification for at least as long as the application is pending.

The scope of protection sought for any invention described herein is defined by the claims which follow. It will be appreciated by those skilled in the art that a variety of possible combinations and subcombinations of the various elements described herein exist, and all of these combinations and subcombinations should be considered to be within the inventor's contemplation though not explicitly enumerated here. This is also true of the variety of aspects of the processes and the combinations and subcombinations of elements thereof.

What is claimed is:

1. A manual garden implement comprising:
   a shaft having a central axis;
   a first ground-working tool mounted at a first lower end of the shaft;
   a second ground-working tool mounted the shaft, movable longitudinally along the shaft between a working position at said end of the shaft and a non-working position remote from said end of the shaft, said second tool comprising a sleeve in which the shaft is received to permit movement of the tool along the shaft between said working and non-working position;
   a stop at the working end of the shaft to axially locate the second tool in said working position; and
   a radially extending abutment affixed with respect to the shaft which provides a surface located to abut a surface of the second tool to preclude release of the second tool from the shaft.

2. A manual garden implement comprising;
   a shaft having a central axis;
   a first ground-working tool permanently mounted at a first lower end of the shaft, said first tool comprising a plurality of groundworking tines which extend downwardly from the lower end of the shaft; and
   a second ground-working tool mounted about the shaft, movable longitudinally along the shaft between a working position at said end of the shaft and a non-working position remote from said end of the shaft.

3. The implement of claim 2, wherein said tines are spaced radially outwardly from the central axis of the shaft.

4. The implement of claim 2, wherein the second tool includes a plurality of groundworking tines which extend axially downwardly from the lower end of the shaft when the tool is in the working position.

5. The implement of claim 3, wherein the second tool includes a plurality of groundworking tines which are spaced radially outwardly of the tines of the first tool and which extend downwardly from the first end of the shaft when the tool is in the working position.

6. A manual garden implement comprising:
   a shaft having a central axis;
   a first ground-working tool mounted at a first lower end of the shaft; and
   a second ground-working tool mounted about the shaft, movable longitudinally along the shaft between a working position at said end of the shaft and a non-working position remote from said end of the shaft,
   wherein the implement includes a first surface affixed with respect to the shaft and a second surface affixed with respect to the second tool, the first and second surfaces being positioned to abut each other when the second tool is in the working position so as to preclude rotation of the second tool with respect to the shaft.

7. The implement of claim 6, wherein the shaft along which the tool moves is of substantially constant outer cross section and the sleeve has a discontinuity extending between lower and upper ends thereof so as to be radially movable between an expanded position in which an inner surface of the sleeve of the second tool defines an aperture having a cross section greater than said outer cross section of the shaft, to permit said movement of the tool along the shaft, and a contracted position in which the surface frictionally engages the outer surface of the shaft, to inhibit said movement.

8. The implement of claim 7, wherein said discontinuity of the sleeve of the second tool is provided by a slit and the sleeve comprises metal sufficiently flexible the permit said radial movement.

9. The implement of claim 8, wherein said implement further comprises a rotatable fastener mounted to the second tool so as to span said discontinuity, wherein when the fastener is rotated in a fastening first direction, first and second surfaces of the fastener engage respective first and second surfaces of the second tool, the first and second surfaces of the tool being located on either side of the discontinuity, so as to force the first and second surfaces of the tool toward each other to move the inner surface of the sleeve from the expanded to contracted position.

10. The implement of claim 9, wherein the sleeve is biased towards the expanded position.

11. The implement of claim 9, wherein when the fastener is rotated in a releasing second direction, third and fourth surfaces of the fastener engage respective third and fourth surfaces of the second tool, the third and fourth surfaces of the tool being located on either side of the discontinuity, so as to force the third and fourth surfaces of the tool apart to move the sleeve from the contracted to the expanded position.

12. The implement of claim 8, wherein said inner surface defines an axial bore and the shaft along which the tool moves defines an axial barrel, central axes of the bore and barrel being substantially aligned with each other, and the second tool further comprises first and second outwardly radially extending fingers, each affixed on either side the slit such that movement of the fingers towards each other into a closed position decreases the size of the bore of the sleeve to bring the inner surface of the sleeve into frictional engagement with the shaft, and a fastening member to permit securing the fingers in the closed position.

13. A manual garden implement comprising:
   a shaft having a central axis;
   a first ground-working, tool mounted at a first lower end of the shaft;

a second ground-working tool mounted about the shaft, movable longitudinally along the shaft between a working position at said end of the shaft and a non-working position remote from said end of the shaft, said second tool comprising a sleeve in which the shaft is received to permit movement of the tool along the shaft between said working and non-working positions;

a first abutment surface affixed with respect to the shaft and transverse to the shaft axis, and a fastener mounted to the second tool, movable between a fastening position and a releasing position, the fastener having a second abutment surface transverse to the shaft axis, wherein the first abutment surface is axially positioned and the second abutment surface is positioned to permit, when the second tool is in the non-working position, engagement of the first and second abutment surfaces with each other to preclude axial movement of the second tool into the working position when the fastener is moved into the fastening position.

14. The implement of claim 13, further comprising a second abutment surface affixed with respect to the shaft and transverse to the shaft axis, and a fastener mounted to the second tool, movable between a fastening position and a releasing position, the fastener having a second abutment surface transverse to the shaft axis, wherein the second abutment surface affixed with respect to the shaft is axially positioned and the second abutment surface of the second tool is positioned to permit, when the tool is in the working position, engagement of the respective second abutment surfaces with each other to preclude axial movement of the second tool into the non-working position when the fastener is moved into the fastening position.

15. The implement of claim 13, wherein said fastener comprises a toggle having a distal end rotatably mounted about an axis transverse to the shaft axis and a proximal end by which the toggle can be manually moved between the fastening and releasing positions.

16. The implement of claim 15, wherein said first abutment surface is located radially inwardly of the outer surface of the shaft within a recess thereof and the toggle comprises a tab received within the recess when the fastener is in the fastening position.

17. The implement of claim 13, wherein the shaft along which the tool moves is of substantially constant outer cross section and the sleeve has a discontinuity extending between upper and lower edges thereof and comprises metal sufficiently flexible to be radially movable between an expanded position in which an inner surface of the sleeve defines an aperture having a cross section greater than said outer cross section of the shaft, to permit said movement of the tool along the shaft, and a contracted position in which the surface frictionally engages the outer surface of the shaft, to inhibit said movement, and the fastener is mounted to the second tool so as to span said discontinuity, wherein when the fastener is rotated from the fastening position to the releasing position, first and second surfaces of the fastener engage respective first and second surfaces of the second tool, the first and second surfaces of the tool being located on either side of the discontinuity, so as to force the first and second surfaces of the tool toward each other to move the inner surface of the sleeve from the expanded to contracted position.

18. The implement of claim 1, wherein the first tool is affixed at the lower end of the shaft and extends a first radial distance from the axis of the shaft, and the second tool, when in the working position, extends a second radial distance from the axis of the shaft, wherein the second distance is greater than the first distance.

19. The implement of claim 1, further comprising a handle at an upper end of the shaft, opposite to the location of the first tool, the handle being detachable from the shaft to permit release of the second tool from the implement by said movement along said shaft and past the upper end.

20. A manual garden implement comprising:

a shaft having a central axis;

a first ground-working tool mounted at a lower end of the shaft;

a second ground-working tool mounted about the shaft, movable longitudinally along the shaft between a working position at said end of the shaft and a non-working position remote from said end of the shaft; and a handle having a downwardly depending column having an axis, the column having a first opening transverse to the column axis for receipt of a fastening member therethrough, and wherein the shaft of the implement has a second opening transverse to the shaft axis for receipt of the fastening member therethrough, wherein the first and second openings are located and the column is shaped for assembly onto the shaft with the first and second openings in communication with each other for insertion of the fastening member therethrough so as to axially affix the handle with respect to the shaft.

21. The implement of claim 20, wherein the column has a plurality of said first openings axially spaced from each other, or the shaft has a plurality of said second openings axially spaced from each other, or the column has a plurality of said first openings axially spaced from each other and the shaft has a plurality of said second openings axially spaced from each other, to permit a user to select the distance of the handle from the lower end the shaft by axial movement of the column with respect to the shaft into a position in which a selected pair of first and second openings are in communication with each other and insertion of the fastening member therethrough to affix the handle at the selected distance.

22. A manual garden implement comprising:

a shaft having a central axis;

a first ground-working tool mounted at a lower end of the shaft; and a second ground-working tool having a sleeve into which is received the shaft, the tool being movable along the shaft between a working position at the lower end of the shaft and a non-working position above the lower end of the shaft; wherein:

the portion of the shaft along which the tool moves between the working position and the non-working position is of substantially constant outer cross section and the sleeve is flexible and has an opening extending its length so as to be radially movable between an expanded position in which an inner surface of the sleeve of the second tool defines an aperture having a cross section greater than said outer cross section of the shaft, to permit said movement of the tool along the shaft, and a contracted position in which the surface frictionally engages the outer surface of the shaft, to inhibit said movement;

a fastener mounted to the second tool so as to span the opening, rotatable between a fastening position and release position, wherein when the fastener is rotated from the release position to the fastening position, first and second surfaces of the fastener engage respective first and second surfaces of the second tool, the first and second surfaces of the tool being located with respect to the opening and the engages surfaces being shaped such that the first and second surfaces of the tool toward each other to move the inner surface of the sleeve from the expanded position to the contracted position; and a first abutment surface affixed with respect to the shaft, and wherein:

the fastener has a second abutment surface, wherein the first abutment surface is axially positioned and the second abutment surface is positioned to permit, when the second tool is in the non-working position, engagement of the first and second abutment surfaces with each other to preclude axial movement of the second tool into the working position when the fastener is in the fastening position.

* * * * *

UNITED STATES PATENT AND TRADEMARK OFFICE
CERTIFICATE OF CORRECTION

PATENT NO. : 6,843,324 B2  
APPLICATION NO. : 10/314441  
DATED : January 18, 2005  
INVENTOR(S) : Basek Page 1 of 1

It is certified that error appears in the above-identified patent and that said Letters Patent is hereby corrected as shown below:

In Claim 1, line 35, between "mounted" and "the", insert --about--.

In Claim 1, line 41, delete "position" and substitute --positions--.

In Claim 13, column 12, line 66, delete ",".

Signed and Sealed this

Fifth Day of December, 2006

JON W. DUDAS  
*Director of the United States Patent and Trademark Office*